US010757240B1

(12) United States Patent
Hvidsten et al.

(10) Patent No.: US 10,757,240 B1
(45) Date of Patent: Aug. 25, 2020

(54) HEADSET-ENABLED AD-HOC COMMUNICATION

(71) Applicant: Cisco Technology, Inc., San Jose, CA (US)

(72) Inventors: Knut Inge Hvidsten, Oslo (NO); Espen Moberg, Nesøya (NO)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 16/506,314

(22) Filed: Jul. 9, 2019

(51) Int. Cl.
*H04M 1/60* (2006.01)
*H04W 84/22* (2009.01)
*H04W 76/14* (2018.01)
*G06F 3/16* (2006.01)
*H04W 4/02* (2018.01)
*H04R 3/02* (2006.01)
*G06F 3/01* (2006.01)

(52) U.S. Cl.
CPC .......... *H04M 1/6066* (2013.01); *G06F 3/012* (2013.01); *G06F 3/167* (2013.01); *H04R 3/02* (2013.01); *H04W 4/025* (2013.01); *H04W 76/14* (2018.02); *H04W 84/22* (2013.01); *H04R 2460/07* (2013.01)

(58) Field of Classification Search
CPC ... H04W 12/02; H04W 12/06; H04M 1/6016; H04M 7/006
See application file for complete search history.

(56) References Cited

U.S. PATENT DOCUMENTS

2019/0028803 A1\* 1/2019 Benattar ................ H04R 1/028

OTHER PUBLICATIONS

Unknown, "5 Rules for Succeeding in an Open-Plan Workspace," APRES, downloaded from Internet Jul. 3, 2019; https://apresgroup.com/five-rules-succeeding-open-plan-workspace, 5 pages.
Cabrera et al., "Binaural measurement and simulation of the room acoustical response from a person's mouth to their ears," Acoustics Australia, vol. 37, No. 3, Dec. 2009, 7 pages.
Brandner, M., "DirPat Repository Element: Directivity Measurements of a Classical Singer," University of Music and Performing Arts Graz, Graz, Austria, Nov. 16, 2018, https://phaidra.kug.ac.at/detail_object/o:76751, 1 page.

(Continued)

*Primary Examiner* — Diane D Mizrahi
(74) *Attorney, Agent, or Firm* — Edell, Shapiro & Finnan, LLC

(57) ABSTRACT

In one example, a first headset establishes a connection with a second headset that is associated with a target participant. The first headset obtains, via the connection, a first audio signal corresponding to speech of the target participant. Based on the first audio signal, one or more parameters associated with a position or a movement of a head of a user of the first headset, one or more head-related transfer functions associated with a shape of the head of the user, and a layout of the environment of the first headset, the first headset modifies the first audio signal to produce a first modified audio signal that corresponds to the speech of the target participant that would be present at the head of the user in absence of the first headset and the noise generated in the environment.

20 Claims, 8 Drawing Sheets

(56) References Cited

OTHER PUBLICATIONS

Bergstrøm, I., "Superior read all research on open landscapes. He found only health injuries and productivity loss," updated Mar. 5, 2019, https://pahoyden.no/2017/10/overlegen-leste-all-forskning-om-apne-landskap-han-fant-bare-helseskader-og, 22 pages.
Wikipedia, "Head-related transfer function," last edited Jan. 25, 2019, https://en.wikipedia.org/wiki/Head-related_transfer_function, 7 pages.
Andersen et al., "Augmented Reality Concentration Cubicle," IPCOM000249206D, IP.com, Cisco Systems, Inc., Feb. 9, 2017, 6 pages.
Arrington, Y., "Meet the Scientists Changing the Way Soldiers Hear," DoD News, Defense Media Activity, May 16, 2017, 4 pages; https://science.dodlive.mil/2017/05/16/meet-the-scientists-changing-the-way-soldiers-hear.
Unknown, "3M 3M™ Peltor™ WS™ Communications Headsets for Worker Health & Safety," 3 pages, downloaded from Internet Apr. 5, 2019, https://www.3m.com/3M/en_US/company-us/all-3m-products/?N=5002385+8709322+8711017+8711405+8720539+8720540+8720753+8726546+3294857497&rt=r3.
Cullings, J., "10 Best Bluetooth Helmet Communication Devices of 2017," Jan. 31, 2017; https://badasshelmetstore.com/10-best-bluetooth-helmet-communication-devices-2017, 18 pages.
Gniazdo, D., "ANC headsets aren't all the same: The three types of ANC," Jabra Blog, Sep. 25, 2015, https://www.jabra.com/blog/anc-headsets-arent-all-the-same-three-types-of-anc, 8 pages.
Halkosaari et al., "Radiation Directivity of Human and Artificial Speech," Nokia, Jun. 8, 2004, 29 pages.
Unknown, "Artificial Reverberation," Physical Audio Signal Processing, downloaded from Internet Apr. 5, 2019; https://www.dsprelated.com/freebooks/pasp/Artificial_Reverberation.html, 40 pages.
Unknown, "Room Acoustics," CMSC 828D, Lecture 20, Spring 2006, 36 pages.
Allen et al., "Image method for efficiently simulating small-room acoustics," J. Acoust. Soc. Am., vol. 65, No. 4, Apr. 1979, pp. 943-950.
Henshall et al., "Shure Whiteboard—Digital Wireless Latency Explained," Wireless Systems, Shure Blog, Nov. 30, 2016, http://blog.shure.com/shure-whiteboard-digital-wireless-latency-explained/, 4 pages.
Brandner et al., "DirPat—Database and Viewer of 2D/3D Directivity Patterns of Sound Sources and Receivers" AES 144th Convention, May 23-26, 2018, Milan, Italy, 6 pages.
Unknown, "Using HTC Vive Trackers without Headset," VVVV, Dec. 20, 2018, https://vvvv.org/blog/using-htc-vive-trackers-without-headset, 3 pages.
Unknown, "SteamVR Tracking," downloaded from Internet Apr. 5, 2019; https://partner.steamgames.com/vrlicensing, 3 pages.
Wikipedia, "Kalman filter," last edited Mar. 27, 2019; https://en.wikipedia.org/wiki/Kalman_filter, 32 pages.
Gan et al., "Adaptive feedback active noise control headset: Implementation, evaluation and its extensions," IEEE Transactions on Consumer Electronics, vol. 51, No. 3, Aug. 2005, 9 pages.
Wikipedia, "5G," last edited Apr. 5, 2019; https://en.wikipedia.org/wiki/5G, 16 pages.
Wikipedia, "Simultaneous Localization and Mapping," last edited Apr. 1, 2019; https://en.wikipedia.org/wiki/Simultaneous_localization_and_mapping, 8 pages.
McCulloch et al., "Spatial sound," Microsoft Docs, Mar. 20, 2018, https://docs.microsoft.com/en-us/windows/mixed-reality/spatial-sound, 4 pages.
Butterworth et al., "The Best Noise-Cancelling Headphones," updated May 30, 2019, https://thewirecutter.com/reviews/best-noise-cancelling-headphones/, 53 pages.
Unknown, "3D In-Ear Mixing with Intuitive Control," KLANG, downloaded from Internet Apr. 5, 2019; https://www.klang.com/en/home, 5 pages.
Lindau, A., "Binaural Resynthesis of Acoustical Environments. Technology and Perceptual Evaluation," Berlin, Jun. 2014, 279 pages.
Jofre et al., "The acoustics of concentric sources and receivers—human voice and hearing applications," Faculty of Architecture, Design and Planning, Aug. 8, 2016, pp. 1-100.
Jofre et al., "The acoustics of concentric sources and receivers—human voice and hearing applications," Faculty of Architecture, Design and Planning, Aug. 8, 2016, pp. 101-197.
Jofre et al., "The acoustics of concentric sources and receivers—human voice and hearing applications," Faculty of Architecture, Design and Planning, Aug. 8, 2016, pp. 198-397.
Oculus VR, "Beyond Surround Sound: Audio Advances in VR," Oculus Blog, Sep. 19, 2017, retrieved from https://www.oculus.com/blog/beyond-surround-sound-audio-advances-in-vr/?locale=en_US, 6 pages.

* cited by examiner

HEADSET-ENABLED AD-HOC COMMUNICATION

TECHNICAL FIELD

The present disclosure relates to headset-enabled communications.

BACKGROUND

An open office environment can be a professional setting where multiple employees work in a shared space. One common example of an open office environment is a large room without individual offices/cubicles for individual employees. Open office environments are popular among employers due to reduced area (rent) per employee, and because open office environments are often seen as trendy, dynamic, and playful. Office technology suppliers are constantly seeking to improve the conditions for employees in open office environments in order to increase workplace productivity.

DESCRIPTION OF EXAMPLE EMBODIMENTS

Overview

In one example embodiment, a first headset performs noise control on noise generated in an environment of the first headset and identifies a target participant to participate in an ad-hoc communication session. In response to identifying the target participant, the first headset establishes a connection with a second headset that is associated with the target participant. The first headset obtains, via the connection, a first audio signal corresponding to speech of the target participant. Based on the first audio signal, one or more parameters associated with a position or a movement of a head of a user of the first headset, one or more head-related transfer functions associated with a shape of the head of the user, and a layout of the environment of the first headset, the first headset modifies the first audio signal to produce a first modified audio signal that corresponds to the speech of the target participant that would be present at the head of the user in absence of the first headset and the noise generated in the environment. The first headset outputs the first modified audio signal to at least one speaker of the first headset.

Example Embodiments

Figure 1:
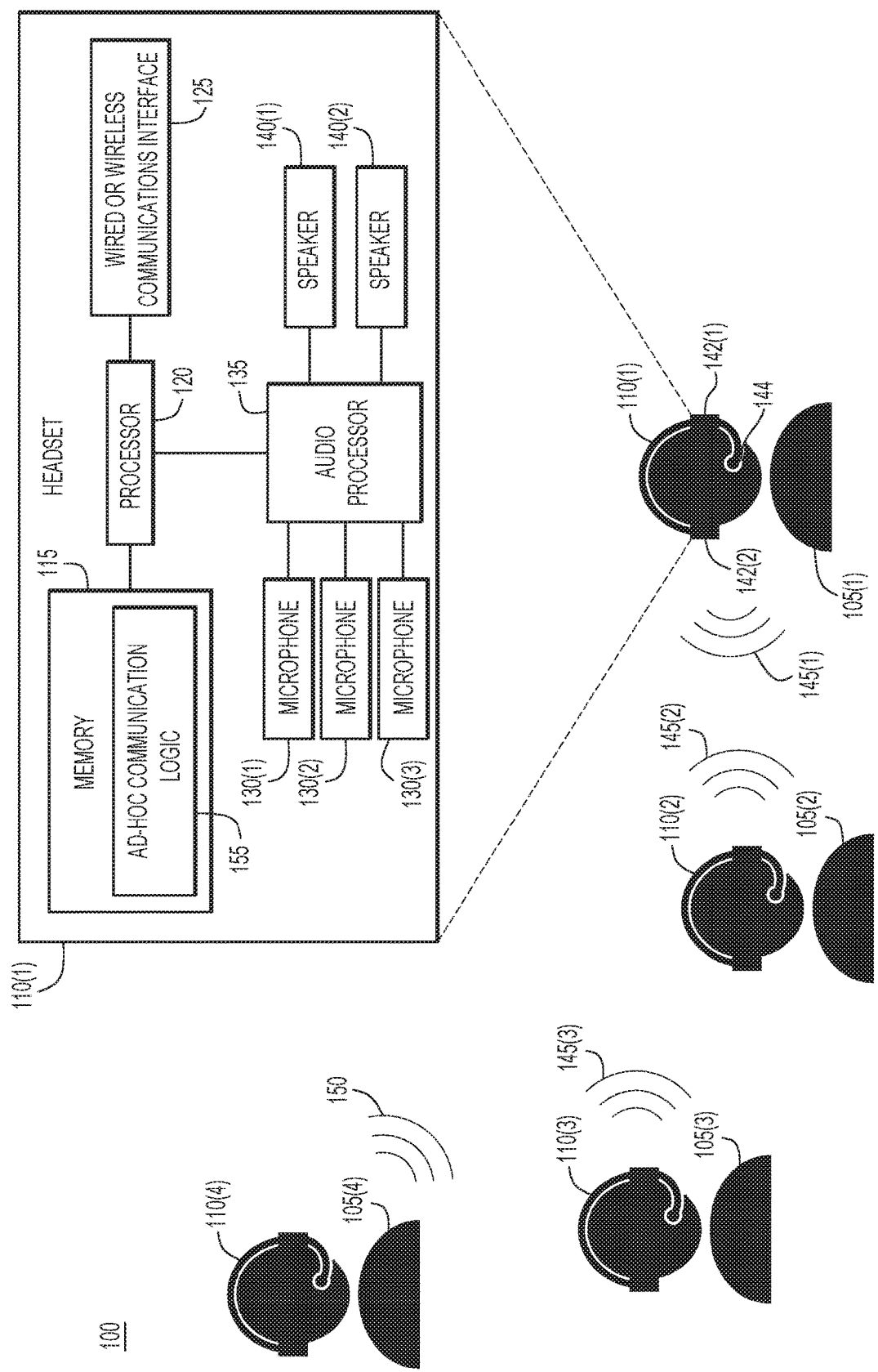
FIG. 1 illustrates a system including a plurality of headsets configured for ad-hoc communication, according to an example embodiment.

With reference made to FIG. 1, an example system 100 is configured for headset-enabled ad-hoc communication. As shown, users 105(1)-105(4) may be employees working in an open office environment. Users 105(1)-105(4) are wearing, respectively, headsets 110(1)-110(4). Headset 110(1) includes memory 115, processor 120, and wired or wireless communications interface 125. Memory 115 may be read only memory (ROM), random access memory (RAM), magnetic disk storage media devices, optical storage media devices, flash memory devices, electrical, optical, or other physical/tangible memory storage devices. Thus, in general, memory 115 may comprise one or more tangible (non-transitory) computer readable storage media (e.g., a memory device) encoded with software comprising computer executable instructions and when the software is executed (by the processor 120) it is operable to perform operations described herein. Wired or wireless communications interface 125 may be configured to operate in accordance with Bluetooth® short-range wireless communication technology or any other suitable technology now known or hereinafter developed.

Headset 110(1) also includes microphones 130(1)-130(3), audio processor 135, and speakers 140(1) and 140(2). Audio processor 135 may include one or more integrated circuits that convert audio detected by microphone 130(3), for example, to digital signals that are supplied (e.g., as analog signals) to processor 120 for wireless transmission via wired or wireless communications interface 125. Thus, processor 120 is coupled to receive signals derived from outputs of microphones 130(1)-130(3) via audio processor 135. Audio processor 135 may also convert received audio (via wired or wireless communication interface 125) to analog signals to drive speakers 140(1) and 140(2). Headsets 110(2) and 110(3) may include similar components as those shown with reference to headset 110(1). Accordingly, headsets 110(1)-110(3) may be identical or at least compatible.

Headset 110(1) includes earpieces 142(1) and 142(2), and boom 144. Earpiece 142(1) is configured to house speaker 140(1) and microphone 130(1). Earpiece 142(2) is configured to house speaker 140(2) and microphone 130(2). Boom 144 is configured to house microphone 130(3). In this example, microphone 130(3) is configured to capture a linear time-invariant, high-quality estimate of the anechoic speech of user 105(1). In this example, microphone 130(3) may be close to the mouth of user 105(1), and may be appropriately treated so as to reduce wind and handling noise. It will be appreciated, however, that any suitable headset (e.g., with boomless array microphones) may be compatible with the techniques described herein. Non-linear noise reduction, beam forming, and/or automatic gain control should not, or only to a moderate degree, be applied to the signal captured by microphone 130(3).

In an embodiment, users 105(1)-105(3) are knowledge workers who want to discuss the progress of their project (e.g., via audio signals 145(1)-145(3), such as speech), but user 105(4) is generating noise 150. User 105(4) may generate noise 150 by speaking with a co-worker, talking on the phone, opening/closing doors, using a coffee machine, etc. Traditionally, due to the lack of privacy in open office environments, noise 150 would lead to a collective loss of concentration among users 105(1)-105(3). In particular, noise 150 can inhibit the discussion between users 105(1)-105(3), leading to a measurable loss in productivity. As such, despite their popularity among employers, there is considerable reluctance among employees to partake in open office environments.

Users 105(1)-105(3) could agree to move to an isolated meeting room/area, but those are often in short supply, and moving may be inconvenient for a relatively short discussion. Users 105(1)-105(3) could also ask user 105(4) to lower noise 150, but this may not be practical, and could contribute to a hostile work environment. Furthermore, there may be cultural differences in what is considered an acceptable noise level. Users 105(1)-105(3) could also use traditional active noise cancellation headsets to cancel noise 150, but those headsets would also cancel audio signal 145(1)-145(3). In addition, it can be difficult for users 105(1)-105(3) to control their own speech levels without the feedback of their own speech levels provided via air to their ears. As such, users 105(1)-105(3) wearing traditional noise cancellation headsets would tend to shout unless they remove the headsets or activate an ambient mode, which would effectively negate many of the noise cancellation properties that provided the original motivation for using the traditional noise cancellation headsets.

Accordingly, memory 115 includes ad-hoc communication logic 155. Briefly, ad-hoc communication logic 155 enables headset 110(1) to perform operations that enable users 105(1)-105(3) to communicate without interference from noise 150. This may improve user experience and efficiency in the open plan environment to enable more flexibility in collaboration, particularly in complex office layouts. In one example, the functions/operations of ad-hoc communication logic 155 may be carried out in hardware by one or more fixed or programmable hardware logic devices, such as one or more Application-Specific Integrated Circuits (ASICs).

In one example, headset 110(1) is a noise-cancelling or noise-reducing headset and, as such, is configured to perform noise control on noise 150. Headset 110(1) may perform noise control in any suitable manner, such as active or passive noise cancellation. For example, headset 110(1) may employ active cancellation techniques to output an audio signal at speakers 140(1) and 140(2) that is opposite from an expected noise signal, thus cancelling acoustic noise in lower frequencies that are impractical to suppress using passive techniques. Active noise cancellation is possible using an external microphone, internal microphone, or both. In any case, careful acoustic design and low latency digital processing may improve noise control. Headset 110(1) may additionally/alternatively employ passive techniques, which may be of particular relevance for higher frequencies. 30-40 dB of noise may be attenuated over a wide range of the audible spectrum so as to effectively decouple user 105(1) from the acoustic environment even in noisy locations.

Headset 110(1) may identify a target participant to participate in an ad-hoc communication session (e.g., user 105(2)). Headset 110(1) may identify user 105(2) based on any number of factors/triggers to opt-in to the ad-hoc communication session. These factors/triggers may include predetermined preferences (e.g., user meeting schedule, shared project association, etc.), conscious actions (e.g., selection via a User Interface (UI) of a user smartphone, video endpoint, etc.), or subconscious actions (e.g., tracking user attention via user head direction, gaze tracking, spoken user name detection, etc.).

In one specific example, headset 110(1) may identify the target participant in response to obtaining a user selection of the target participant. For instance, user 105(1) may select user 105(2) via a UI. In another specific example, headset 110(1) may identify the target participant in response to determining that the target participant is positioned in a given physical location relative to the head of user 105(1). For instance, headset 110(1) may render only sources within +/−30 degrees of the forward facing angle of user 105(1) (e.g., virtual beamforming). In this case, user 105(1) may angle his or her head such that user 105(2) is within +/−30 degrees of the forward facing angle of user 105(1) but user 105(4) is not.

In response to identifying the target participant (e.g., user 105(2)), headset 110(1) may establish a connection with headset 110(2). In one example, the connection may be a headphone-to-collaboration client connection via Bluetooth®. In another example, the connection may be made via Internet Protocol (IP), Wi-Fi®, and/or any other suitable wired and/or wireless network. The connection may be a peer-to-peer connection capable of distributing encrypted high-quality speech and audio at low latency to any device nearby (e.g., using Bluetooth). For example, the connection may broadcast speech from user 105(2) within an acoustically relevant range (e.g., 20 meter line-of-sight and 5 meter non-line-of-sight with low latency such as 5 ms), be encoded losslessly or nearly losslessly, and have suitable privacy (e.g., encryption with some scheme for granting user 105(1) access to speech from user 105(2)).

Ultrasound mechanisms may be used to verify/authorize users 105(1) and 105(2) and their positioning. The 5th Generation telecommunication standard (5G) may use shorter wavelengths (e.g., 10-60 GHz) and high-scale Multiple-Input Multiple-Output (MIMO) (e.g., a high number of transceiver antennas) techniques in order to provide high bandwidth in compact and low-energy radios at the cost of complexity and range. As such, beamformed or MIMO radio communication systems may enable the audio distribution network to position other sources as an inherent part of the modem, rather than (or complementing) explicit positioning technologies.

Headset 110(1) may obtain audio signal 145(2) via the connection and, based on audio signal 145(2), modify audio signal 145(2) to produce a modified audio signal that corresponds to the speech of user 105(2) that would be present at the head of user 105(1) in the absence of headset 110(1) and noise 150. Headset 110(1) may output the modified audio signal to speakers 140(1) and 140(2).

Headset 110(1) may produce the modified audio signal based on one or more parameters associated with a position or a movement of the head of user 105(1). For example, headset 110(1) may track six degrees of freedom of the head of user 105(1). The six degrees of freedom may include the three dimensions in which headset 110(1) can move (i.e., the x-, y-, and z-axes), as well as the three directions of rotation between those axes (i.e., pitch, yaw and roll). Headset 110(1) may track the six degrees of freedom of the head of user 105(1) (and/or headset 110(1)) with high accuracy and short latency.

Headset 110(1) may use any suitable mechanism to track the six degrees of freedom of the head of user 105(1). For example, headset 110(1) may include one or more accelerometers, gyroscopes, and/or magnetometers. These mechanisms may operate at sufficiently low latency and high accuracy, but may only provide estimates of first- and second-order derivatives of the absolute position/rotation of headset 110(1). As such, headset 110(1) may also/alternatively use ground truth measurements. For outdoor devices (e.g., smart phones, drones, etc.), a Global Positioning System (GPS) may be used. For indoor devices, because GPS coverage is poor, headset 110(1) may instead (or in addition) use the camera/head/speech-tracking capabilities of one or more video conferencing endpoints. The video conferencing endpoints may, for example, have cameras to accurately determine the elevation, azimuth, distance, and/or rotation of the head of user 105(1) relative to the camera.

Headset 110(1) may also use the positioning capabilities of an ultrasound pairing protocol whereby a signal is transmitted from endpoint loudspeakers and received at one or more of microphones 130(1)-130(3) using triangulation to solve for position. In another example, Wi-Fi® Wireless Local Area Network (WLAN) Access Points (APs) installed at every N square meters of the open office environment may estimate the position of headset 110(1) within the open office environment. Headset 110(1) may use any appropriate integration (e.g., Kalman filtering) to obtain a low-latency, accurate position estimate. In one specific example, room-wide six degrees of freedom tracking may be implemented which employs active infrared illumination of two orthogonal axes, mechanically swept laser base stations, and multiple infrared sensors in headset 110(1), operating in a time-synchronous fashion.

Headset 110(1) may also produce the modified audio signal based on one or more head-related transfer functions associated with a shape of the head of the user. A head-related transfer function models how an ear perceives sound. This may depend on a number of variables such as the size and shape of the head, ears, ear canal, and nasal and oral cavities, density of the head, etc. Each ear of user 105(1) may be modeled as receiving the modified audio signal at slightly different times and frequency/phase modifications due to the shape and shadowing of the head of user 105(1).

Headset 110(1) may thereby render a point source processed by head-related transfer functions in response to movement/location/positioning of users 105(1) and/or 105(2) to produce a realistic audio signal. Because head-related transfer functions may be unique for each user, facial imaging may be used to fit a parametric model of head-related transfer functions (e.g., anthropometric head-related transfer functions (HRTFs)). The variable (physical) width of headset 110(1) may be used to estimate the head size of user 105(1). In addition, the far-field head-related transfer function may be a function of two-dimensional angle and time (minus shift). Point samples may serve as practical measurements, and various strategies may be used for generating a continuous function of the two angles (e.g., nearest-neighbor interpolation). Furthermore, to avoid radio link latency, headset 110(1) may run a large number of Finite Impulse Response (FIR) filters in response to user movement in parallel in order to generate a large number of sources at arbitrary angles. It will be appreciated, however, that even without personalized (unique) head-related transfer function rendering, headset 110(1) may instead use a baseline one-size-fits-all head-related transfer function rendering configured to execute on battery-powered Systems-on-Chip (SoCs) or ASICs of headset 110(1).

Headset 110(1) may also produce the modified audio signal based on a layout of the open office environment. For example, headset 110(1) may use Simultaneous Localization and Mapping (SLAM) to integrate several environmentally aware sensors to determine the layout. SLAM may use cameras such as depth-sensing, stereoscopic, ultrasound, RAdio Detection And Ranging (RADAR), LAser Detection And Ranging (LADAR), etc. Headset 110(1) may use the sensors to analyze room parameters (e.g., size, location of major walls, etc.) and thereby produce the modified audio signal. The modified audio signal would reflect off the walls, floor, and ceiling and travel from user 105(2) to the ears of user 105(1) at slightly different times and frequency/phase modifications. Later reverberations may be simulated using a low-parameter stochastic model of room reverberation.

In another example, headset 110(1) may model or estimate the acoustics of speech from the mouth of user 105(2) to user 105(1) based on the relative azimuth, elevation, and distance of user 105(2) relative to user 105(1). The particular manner in which user 105(2) radiates acoustic energy from the mouth, nose, neck, and chest may be unique to user 105(2) and may further depend on the syllable pronounced by user 105(2) at any given time. As such, headset 110(1) may perform syllable recognition and syllable-dependent processing to determine accurate source directivity. Alternatively, if headset 110(1) is capturing the audio signal from a single microphone (e.g., microphone 130(3) in boom 144), headset 110(1) may use a spatially parametric Linear Time-Invariant (LTI) filter that relates the captured audio signal to radiated sound in some averaged or estimated manner. Filters used for source directivity may be interpolated to account for individual differences and lack of syllable awareness.

Thus, headset 110(1) may enable user 105(1) to obtain anechoic speech from user 105(2) without interference from user 105(4). Meanwhile, user 105(4) may not opt into the conversation between users 105(1) and 105(2) (and 105(3)). Accordingly, speech may be rendered as if users 105(1)-105(3) had both removed their headphones, but without interfering with (or being interfered by) noise 150 produced by user 105(4). Thus, source directivity, direct wave, wall/floor/ceiling reflections, and other features may be modeled as waves propagating from user 105(2) to user 105(1) (for example), modified by the head-related transfer function(s) of user 105(1) and rendered at speakers 140(1) and 140(2). Later reverberation (and room noise) may be added in a parametric-stochastic fashion. Headset 110(1) may further suppress this reverberation/noise in order to create a user experience that is more comfortable than real life.

By manipulating the sound generated at each ear according to the head-related transfer functions of user 105(1), the movement/distance/speech/rotation/etc. of user 105(1), and the physical room/layout, headset 110(1) may provide the illusion of a synthetic object (here, user 105(2)) producing a sound that is consistent with the physical room. Being able to re-create physical reality is useful towards manipulating interfering voices without introducing annoying or disturbing artifacts. Once this is achieved, headset 110(1) may offer non-physical audio in a comfortable manner that improves project productivity. For example, headset 110(1) may simulate a non-reverberant, early-reflection-only audio signal, or may simulate small-room-acoustics within a large open floor plan office, or align the speech level of participants using automatic gain control. As the acoustic scene is rendered synthetically, user selection may be performed on a per-source basis while maintaining the full spatial (simulated) reverberation from all room surfaces. Thus, users 105(1)-105(3) may have a comfortable conversation without disturbance from user 105(4). The active/passive noise reduction and ad-hoc communication features provided by headsets 110(1)-110(4) may ensure that most in-room acoustic noise is reduced to barely audible levels to allow for quiet concentration, listening to music, etc.

In a further example, headset 110(1) also provides a side tone to user 105(1). A side tone may be feedback/monitor of the voice of user 105(1). Without a side tone, user 105(1) may not appreciate how loudly he or she is speaking. Thus, the side tone enables user 105(1) to better control his or her own speech level. Notably, this enables user 105(1) to speak comfortably and at a typical level of loudness without having to remove headset 110(1) or switching to an ambient mode. This is fundamentally different from entering ambient mode at least in that headset 110(1) may continue to cancel noise 150 while permitting the speech of user 105(1) to filter through.

To this end, headset 110(1) may obtain an audio signal corresponding to speech of user 105(1) (here, audio signal 145(1)). For example, headset 110(1) may perform anechoic speech capture using microphone 130(3) in boom 144. Based on the audio signal, one or more parameters associated with a position or a movement of the head of user 105(1), one or more head-related transfer functions associated with a shape of the head of user 105(1), and the layout of the open office environment, headset 110(1) may produce a modified audio signal that corresponds to the speech of user 105(1) that would be present at the head of user 105(1) in the absence of headset 110(1) and noise 150. Headset 110(1) may output the modified audio signal to speakers 140(1) and/or 140(2).

Thus, headset 110(1) may produce the speech of user 105(1) as a simulation of the airborne sound feedback in natural communication with high quality and non-excessive latency. Headset 110(1) may perform a spatial room reverberation based on user position, room parameters, and head-related transfer functions. Headset 110(1) may integrate the active signal captured by microphone 130(3) filtered and presented at speakers 140(1) and 140(2), the air-borne direct sound residual between the mouth and ears of user 105(1) that is present even after active and passive noise reduction/cancellation, and the structurally-borne sound propagating from speech-generating organs (e.g., mouth) and to the ear of user 105(1). Maintaining a low processing latency and matching an absolute playback level may help provide a believable experience and reduce or eliminate annoying comb-filter-like artifacts. It will be appreciated that, as an alternative to performing spatial room reverberation, headset 110(1) may provide a level-calibrated representation of the direct sound only to reduce sensor or processing cost, or based on user preferences.

In another example, one or more of users 105(1)-105(3) may be remote video conference participants presented on a display to each other. For instance, user 105(1) may call in remotely (e.g., from a home office) to join the conversation with user 105(2). An image of user 105(1) may be rendered at a display local to user 105(2), and the audio from user 105(1) may be perceptually locked to the video image by tracking the head of the user 105(1), irrespective of how user 105(1) moves in space. For example, a video conferencing endpoint local to user 105(2) may track user 105(2) and provide this information to headset 110(1) to enable headset 110(1) to reproduce audio from user 105(2) as if user 105(2) was in the same (remote) room as user 105(1). Thus, headset 110(1) may enable user 105(1) to identify a current speaker based on the tracking capabilities of the video conferencing endpoint. This may effectively reduce the first-class/second-class distinction between local and remote participants, as headset 110(1) (for example) may help join all participants in a common augmented reality meeting scene.

Figure 2:
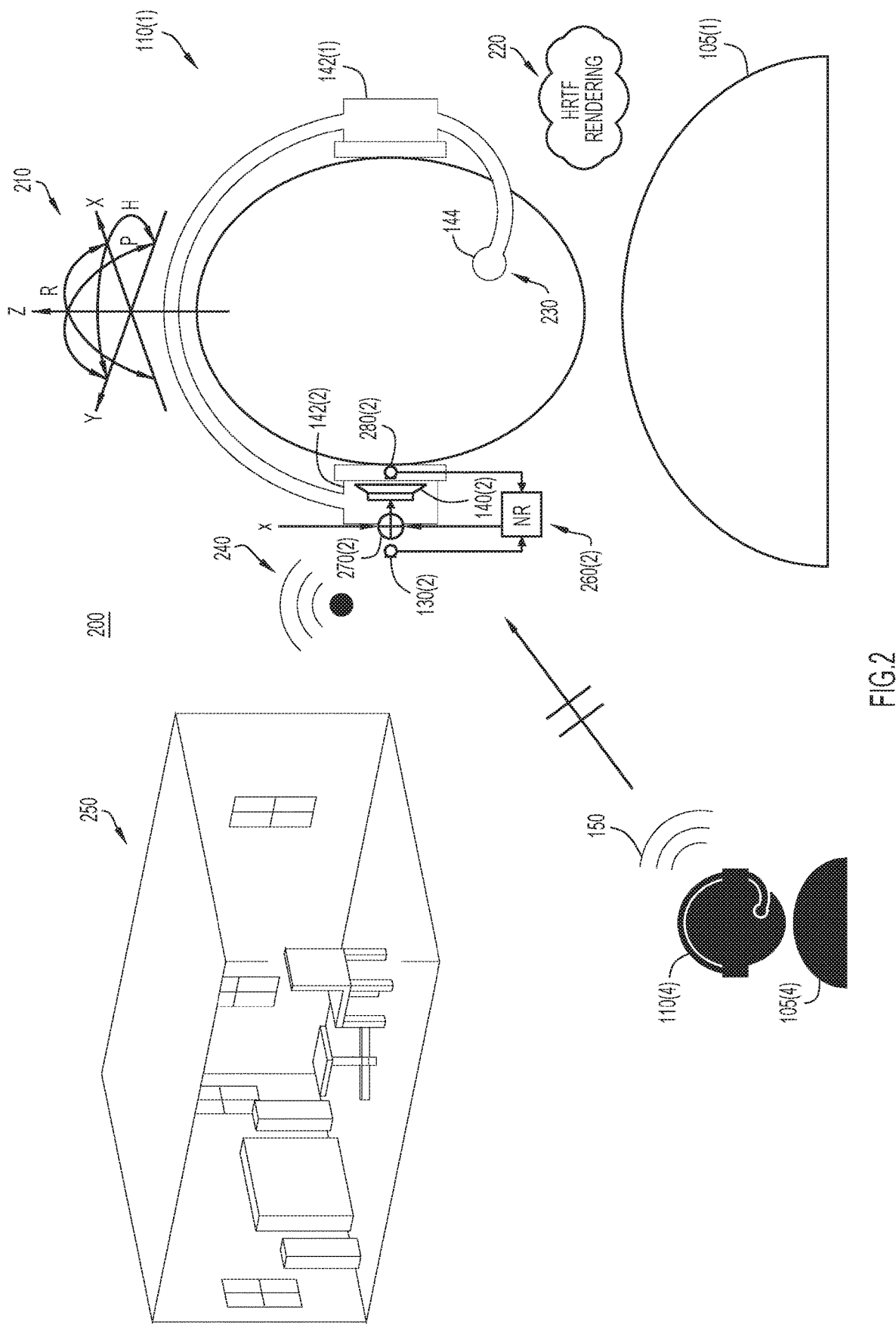
FIG. 2 illustrates various features of a headset configured for ad-hoc communication, according to an example embodiment.

FIG. 2 illustrates an example portion 200 of system 100 in greater detail. In particular, various features of headset 110(1) are illustrated in FIG. 2. These features include six degree of freedom tracking 210, head-related transfer function rendering 220, anechoic speech capture 230, wireless audio streaming 240, and room awareness 250. Six degree of freedom tracking 210 may include functionality for tracking the three dimensions in which headset 110(1) can move and the three directions of in which headset 110(1) can rotate. Head-related transfer function rendering 220 may involve applying one or more head-related transfer functions associated with a shape of the head of user 105(1). Anechoic speech capture may be carried out by microphone 130(3) in boom 144. Wireless audio streaming 240 may be enabled via a peer-to-peer connection between headsets 110(1)-110(3), for example. Headset 110(1) also includes circuitry/logic for noise reduction/cancellation module 260(2) associated with earpiece 142(2). To that end, headset 110(1) includes summing node 270(2) which adds noise 150 with an opposite signal 280(2) to cancel noise 150. It will be appreciated that earpiece 142(1) may include similar circuitry/logic for noise reduction/cancellation. Operation of the components shown in FIG. 2 is described below in connection with FIG. 3 and subsequent figures.

Figure 3:
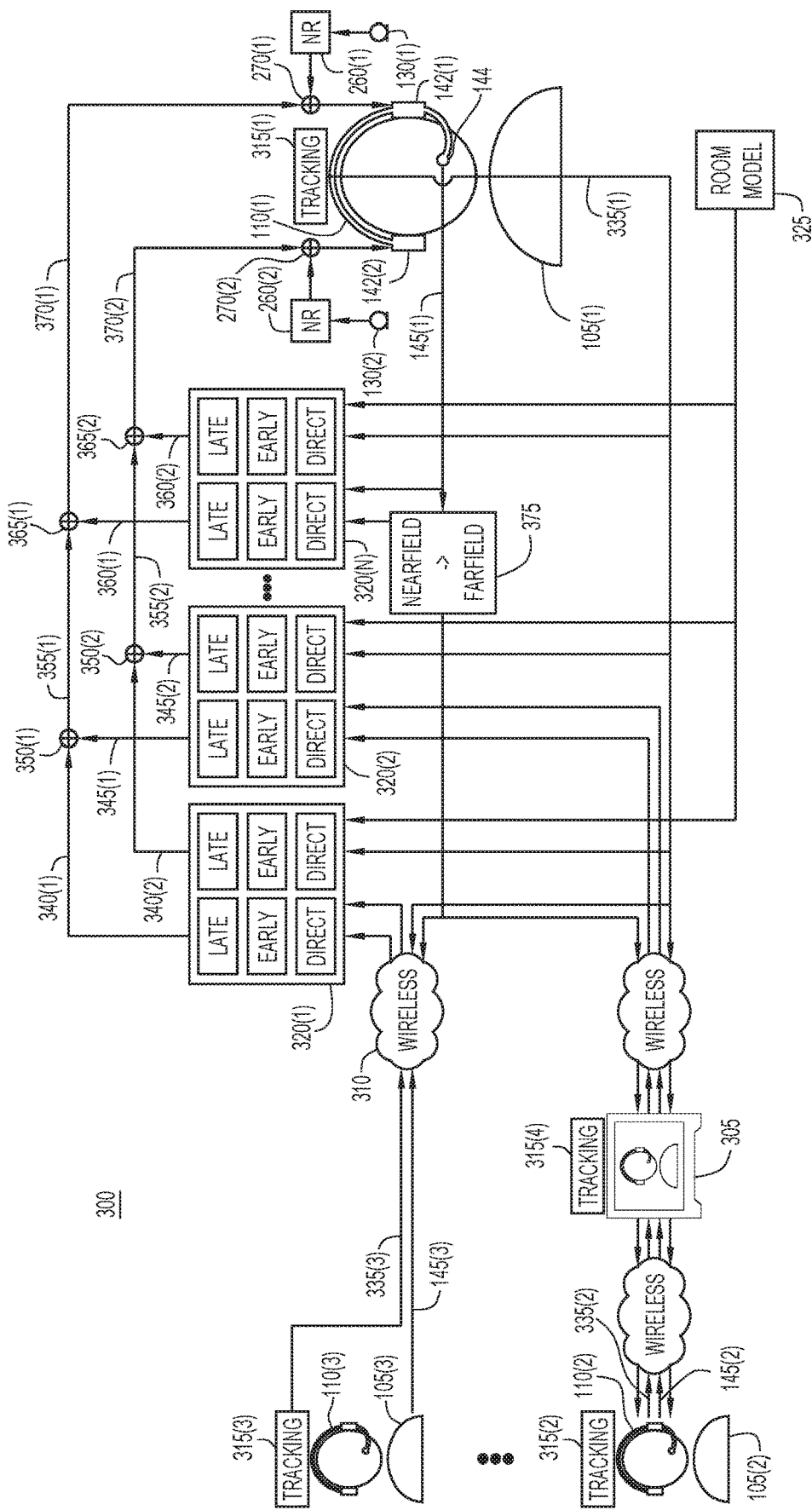
FIG. 3 illustrates audio signal flow operations for headset-enabled ad-hoc communication, according to an example embodiment.

FIG. 3 illustrates an example portion 300 of system 100 in greater detail. In particular, FIG. 3 shows a signal processing/operational flow for user 105(1) who is in an ad-hoc communication session with users 105(2) and 105(3). In this example, user 105(2) is a remote video conference participant, and participates through video conference endpoint 305. User 105(3) is local to user 105(1), and participates through wireless network 310. It will be appreciated that any suitable number of local (physically present) participants and/or remote video conference participants may participate in the ad-hoc communication.

Headset 110(1), for example, includes noise reduction/cancellation module 260(1) and summing node 270(1) associated with earpiece 142(1), and noise reduction/cancellation module 260(2) and summing node 270(2) associated with earpiece 142(2). Headset 110(1) also includes circuitry/logic for tracking module 315(1), which is configured to carry out operations in accordance with various features of headset 110(1) (e.g., six degree of freedom tracking 210, head-related transfer function rendering 220, anechoic speech capture 230, wireless audio streaming 240, room awareness 250, etc.). Similarly, headset 110(2) includes tracking module 315(2), headset 110(3) includes tracking module 315(3), and video conference endpoint 305 includes tracking module 315(4).

Headset 110(1) may also include processing blocks 320(1)-320(N). Processing block 320(1) handles communications from user 105(3), and processing block 320(2) handles communications from user 105(2). Processing block 320(N) handles communications from user 105(1). Each processing block 320(1)-320(N) models the direct acoustic path to user 105(1) as well as early and late reverberations of the communication. The direct acoustic paths may be modeled using a linear filter. The early and late reverberations may be modeled based on the open office environment (e.g., room model 325). Room model 325 may be relatively simple or complex. For example, room model 325 may be free space, a convenient virtual box enclosing users 105(1)-105(3), a more-or-less accurate model of the physical room, etc. Room model 325 may be pre-programmed (e.g., by a network administrator), or automatically generated via SLAM (e.g., using two-and-a-half dimensional cameras headsets 110(1)-110(3) and/or video conference endpoint 305 to track the room, either individually or collectively).

In one specific example, headset 110(3) transmits audio signal 145(3) (e.g., speech) from user 105(3) to headset 110(1). Headset 110(3) may also transmit audio perception factors 335(3), which may be detected via tracking module 315(3) (e.g., six degrees of freedom of user 105(3), etc.).

Processing block 320(1) may obtain audio signal 145(3) and audio perception factors 335(3). Processing block 320(1) may also obtain audio perception factors 335(1), which may be detected via tracking module 315(1) (e.g., six degrees of freedom of user 105(1), etc.). Processing block 320(1) may further obtain room model 325. Based on audio signal 145(3), audio perception factors 335(1) and 335(3), and room model 325, processing block 320(1) produces modified audio signals 340(1) and 340(2) that correspond to the speech of user 105(3) that would be present at respective ears of user 105(1) in the absence of headset 110(1) and any noise generated in the open office environment.

Similarly, headset 110(2) transmits audio signal 145(2) from user 105(2) (e.g., speech) to headset 110(1). Headset 110(2) may also transmit audio perception factors 335(2), which may be detected via tracking module 315(2) (e.g., six degrees of freedom of user 105(2), etc.). Processing block 320(2) may obtain audio signal 145(2) and audio perception factors 335(2). Processing block 320(2) may also obtain audio perception factors 335(1) and room model 325. User 105(2) may be tracked by headset 110(2) in the remote room (audio perception factors 335(2)), as well as on the display of video conference endpoint 305 in the open office environment. For example, user 105(2) may be tracked on the display by video conference endpoint 305 and/or headset 110(1).

Based on audio signal 145(2), audio perception factors 335(1) and 335(2), and room model 325, processing block 320(2) produces modified audio signals 345(1) and 345(2) that correspond to the speech of user 105(2) that would be present at respective ears of user 105(1) in the absence of headset 110(1) and any noise generated in the open office environment. Summing node 350(1) may add modified audio signal 340(1) and modified audio signal 345(1) to produce modified audio signal 355(1), and summing node 350(2) may add modified audio signal 340(2) and modified audio signal 345(2) to produce modified audio signal 355(2).

Headset 110(1) may capture audio signal 145(1) (e.g., speech) from user 105(1) via boom 144. Headset 110(1) may also generate audio perception factors 335(1), which may be detected via tracking module 315(1) (e.g., six degrees of freedom of user 105(1), etc.). Processing block 320(1) may obtain audio signal 145(1), audio perception factors 335(1), and room model 325, and based thereon produce modified audio signals 345(1) and 345(2) that correspond to the speech of user 105(1) that would be present at respective ears of user 105(1) in the absence of headset 110(1) and any noise generated in the open office environment.

Summing node 365(1) may add modified audio signal 355(1) and modified audio signal 360(1) to produce modified audio signal 370(1), and summing node 365(2) may add modified audio signal 355(2) and modified audio signal 360(2) to produce modified audio signal 370(2). Headset 110(1) may provide modified audio signals 370(1) and 370(2) to earpieces 142(1) and 142(2), respectively, via summing nodes 270(1) and 270(2). Thus, realistic audio rendering may be enabled by compatibility of headsets 110(1)-110(3), tracking of users 105(2) and 105(3) and the display of video conference endpoint 305, suitable audio signaling, referencing far-end geometry to video conference endpoint 305, etc.

Headsets 110(2) and 110(3) may have similar functionalities corresponding to processing blocks 320(1)-320(N). Specifically, headsets 110(2) and 110(3) may obtain similar inputs to produce modified audio signals. For example, user 105(1) may provide audio signal 145(1) to headsets 110(2) and 110(3). Headsets 110(1), 110(2), and/or 110(3) may convert audio signal 145(1) from near field to far field, as represented by block 375. This is because the physical/virtual distance between the mouth of user 105(1) and the ears of users 105(2) and 105(3) is in the far field regime, whereas the physical distance between the mouth and ears of user 105(1) is to some degree in the near field regime. The acoustic path from the mouth of user 105(1) to the ears of user 105(1) is more or less static and is therefore latency-critical. As such, provided are techniques to avoid redundant (and latency-increasing) processing steps.

Figure 4:
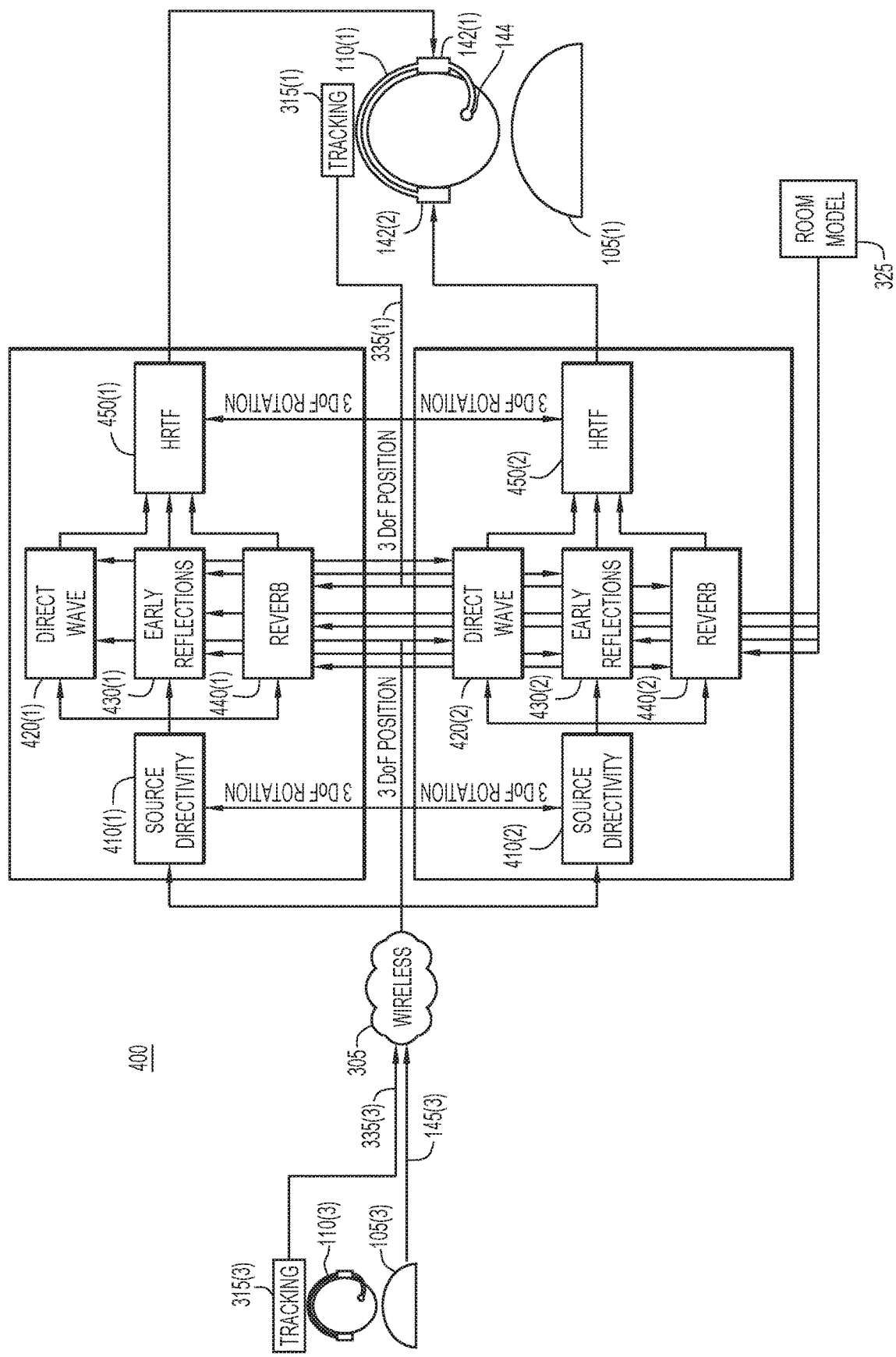
FIG. 4 illustrates further audio signal flow operations for headset-enabled ad-hoc communication, according to an example embodiment.

FIG. 4 illustrates an example portion 400 of system 100 in greater detail. In particular, FIG. 4 shows a signal processing and signal flow associated with tracking user position and rendering audio signal 145(3) at earpieces 142(1) and 142(2). As shown, headset 110(1) may include source directivity modules 410(1) and 410(2), direct wave modules 420(1) and 420(2), early reflections modules 430(1) and 430(2), reverberations modules 440(1) and 440(2), and head-related transfer function modules 450(1) and 450(2). Source directivity module 410(1), direct wave module 420(1), early reflections module 430(1), reverberations module 440(1), and head-related transfer function module 450(1) are associated with earpiece 142(1). Source directivity module 410(2), direct wave module 420(2), early reflections module 430(2), reverberations module 440(2), and head-related transfer function module 450(2) are associated with earpiece 142(2).

Audio perception factors 335(3) feed into source directivity modules 410(1) and 410(2), direct wave modules 420(1) and 420(2), early reflections modules 430(1) and 430(2), and reverberations modules 440(1) and 440(2). Audio perception factors 335(1) feed into direct wave modules 420(1) and 420(2), early reflections modules 430(1) and 430(2), reverberations modules 440(1) and 440(2), and head-related transfer function modules 450(1) and 450(2). In this example, source directivity modules 410(1) and 410(2) obtain three degrees of freedom of rotation from headset 110(3). Direct wave modules 420(1) and 420(2), early reflections modules 430(1) and 430(2), and reverberations modules 440(1) and 440(2) obtain respective three degrees of freedom of position from headset 110(1) and headset 110(3). Head-related transfer function modules 450(1) and 450(2) obtain three degrees of freedom of rotation from headset 110(1). Early reflections modules 430(1) and 430(2) and reverberations modules 440(1) and 440(2) may also utilize room model 325.

In one example, audio signal 145(3) proceeds to source directivity module 410(1). Based on the three degrees of freedom of rotation from headset 110(3), source directivity module 410(1) selects the appropriate far-field/plane-wave source directivity function for audio signal 145(3). Audio signal 145(3) proceeds to direct wave module 420(1), early reflections module 430(1), and reverberations module 440(1), which may perform respective operations based on the three degrees of position from headsets 110(1) and 110(3).

In one example, direct wave module 420(1), early reflections module 430(1), and reverberations module 440(1) may calculate the relative three degrees of freedom of position between users 105(1) and 105(3). Direct wave module 420(1) may simulate a free-space direct wave. Early reflections module 430(1) may determine early reflections of audio signal 145(3) based further on room model 325. Similarly, reverberations module 440(1) may determine reverberations of audio signal 145(3) based further on room model 325. Once rendering begins at earpiece 142(1), head-related transfer function module 450(1) may select the appropriate head-related transfer function for audio signal 145(3) based on the three degrees of freedom of rotation from headset 110(1). It will be appreciated that source directivity module 410(2), direct wave module 420(2), early reflections module 430(2), reverberations module 440(2), and head-related transfer function module 450(2) may perform similar operations with respect to earpiece 142(2). Thus, headset 110(1) may produce a realistic simulation of audio signal 145(3) based on room acoustics and relative user positioning.

Moreover, if the three degrees of freedom of position relative to a physical or virtual room is available, room acoustics may be simulated using one or more techniques (e.g., auralization), for instance, the method of mirror images, room modes, ray tracing, finite element physical modeling, and/or stochastic approaches to reverberation. Stochastic approaches to reverberation may involve convolving the audio signal with a noise-like filter kernel where decay is a function of the desired room reverberation time, rt60 (e.g., the amount of time sound takes to decay by 60 dB), or using all-pass/comb-filter structures. Highly accurate (deterministic) directional properties may only be used for direct sound and the first few reflections. For later reflections, humans in typical rooms experience an ever denser sum of many reflections from many directions that may be more efficiently simulated by headset 110(1) using a stochastic approach. It will be appreciated that any suitable combination of techniques may depend on available room parameters, room size, frequency of interest, computational power, etc.

Figure 5:
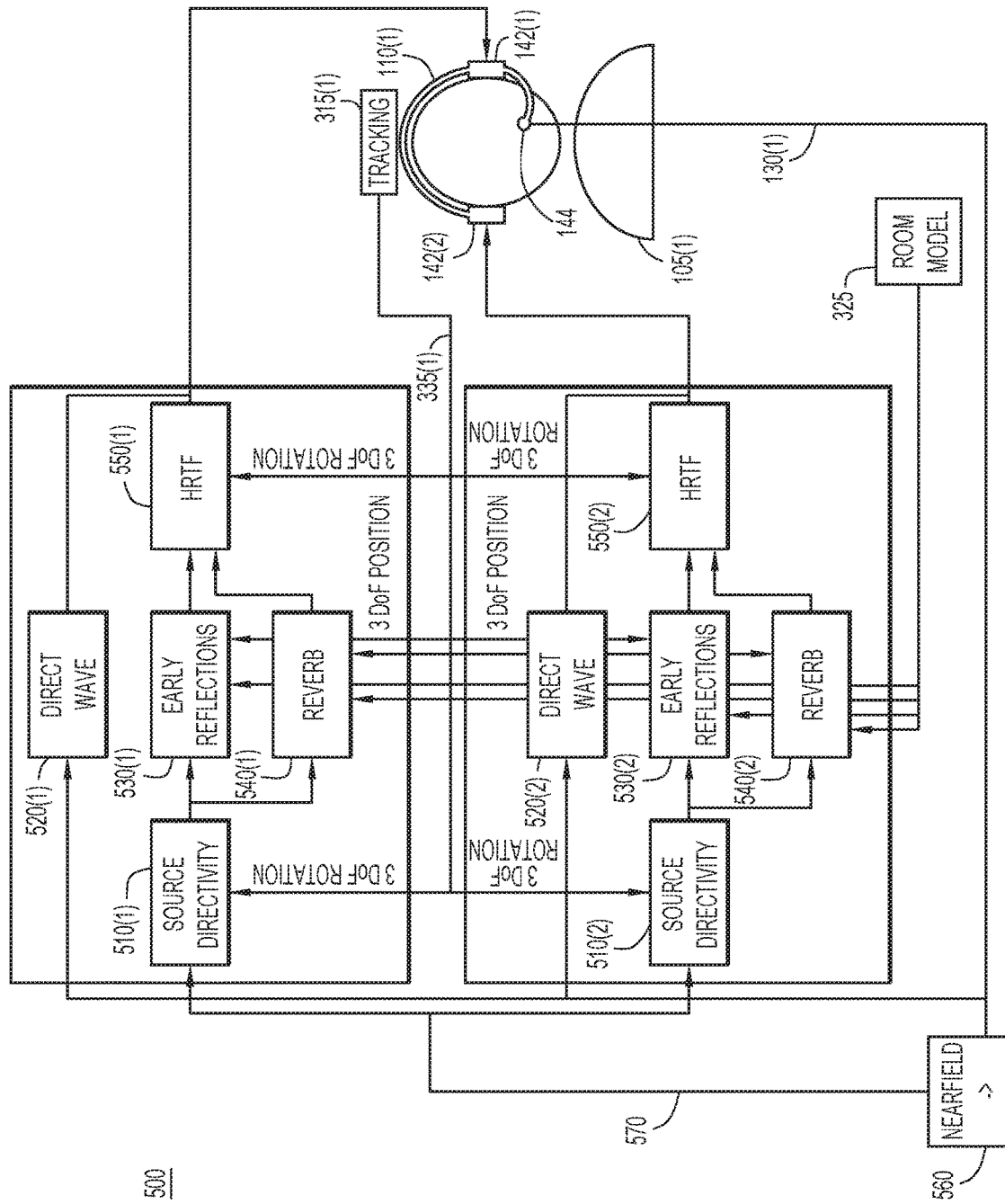
FIG. 5 illustrates still further audio signal flow operations for headset-enabled ad-hoc communication, according to an example embodiment.

FIG. 5 illustrates an example portion 500 of system 100 in greater detail. In particular, shown is the signal processing and signal flow associated with side tone (e.g., audio signal 145(1) rendered at earpieces 142(1) and 142(2)). As shown, headset 110(1) may include source directivity modules 510(1) and 510(2), direct wave modules 520(1) and 520(2), early reflections modules 530(1) and 530(2), reverberations modules 540(1) and 540(2), and head-related transfer function modules 550(1) and 550(2). Source directivity module 510(1), direct wave module 520(1), early reflections module 530(1), reverberations module 540(1), and head-related transfer function module 550(1) are associated with earpiece 142(1). Source directivity module 510(2), direct wave module 520(2), early reflections module 530(2), reverberations module 540(2), and head-related transfer function module 550(2) are associated with earpiece 142(2).

Audio perception factors 335(1) feed into source directivity modules 510(1) and 510(2), early reflections modules 530(1) and 530(2), reverberations modules 540(1) and 540(2), and head-related transfer function modules 550(1) and 550(2). In this example, source directivity modules 510(1) and 510(2) and head-related transfer function modules 550(1) and 550(2) obtain three degrees of freedom of rotation from headset 110(1). Early reflections modules 530(1) and 530(2) and reverberations modules 540(1) and 540(2) obtain three degrees of freedom of position from headset 110(1). Early reflections modules 530(1) and 530(2) and reverberations modules 540(1) and 540(2) may also obtain room model 325. However, if room model 325 is not available or emulation of free space is desired, the side tone topology may collapse to two static filters/convolutions (e.g., short filtering kernels), one for each earpiece 142(1) and 142(2). If user 105(1) is assumed to be symmetrical and microphone 130(3) is sufficiently symmetrically placed, only one convolution may be necessary.

In one example, (near field) microphone 130(3) in boom 144 captures audio signal 145(1) (e.g., speech) from user 105(1). As represented by block 560, headset 110(1) may filter audio signal 145(1) to produce filtered audio signal 570, which resembles a far-field on-axis microphone response. Headset 110(1) may distribute filtered audio signal 570 to other participants (e.g., users 105(2) and 105(3)) via a wireless network.

Headset 110(1) may also provide filtered audio signal 570 to source directivity module 510(1). Based on the three degrees of freedom of rotation from headset 110(1), source directivity module 510(1) selects the appropriate far-field/plane-wave source directivity function for filtered audio signal 570. Filtered audio signal 570 proceeds to early reflections module 530(1) and reverberations module 540(1). Early reflections module 530(1) may determine early reflections of audio signal 145(1) based further on room model 325. Reverberations module 540(1) may generate a reverberant response to user 105(1)'s own voice based on the three degrees of freedom of rotation from headset 110(1) and based further on room model 325. Head-related transfer function module 550(1) may select the appropriate head-related transfer function for filtered audio signal 570 based on the three degrees of freedom of rotation from headset 110(1). Moreover, direct wave module 520(1) may simulate the air-borne (non-room-reflected) wave, using audio signal 145(1) (which is raw/unfiltered) and a static filter modeling a boom microphone-to-ear transfer function.

Headset 110(1) may render the side tone generated by source directivity module 510(1), direct wave module 520(1), early reflections module 530(1), reverberations module 540(1), and head-related transfer function module 550(1) at earpiece 142(1). It will be appreciated that source directivity module 510(2), direct wave module 520(2), early reflections module 530(2), reverberations module 540(2), and head-related transfer function module 550(2) may perform similar operations with respect to earpiece 142(2). Thus, headset 110(1) may produce a realistic simulation of audio signal 145(1) based on room acoustics and relative user positioning.

Due to short acoustic paths, the total processing delay may be minimized for local speech by bypassing the Analog-to-Digital Converter (ADC)/Digital-to-Analog Converter (DAC) and digital signal processor for an all-analog side tone (e.g., level, filtering, etc.). Audio ADCs and DACs optimized for latency may be used with approximately seven samples each for pre/post-filtering (using non-linear-phase low-pass filters). A digital signal processor/ASIC with predictable scheduling (e.g., operating on single samples rather than buffered) may also be used, for example at a sample rate of 96 kHz, 2*7/96e3=0.15 ms, or 5 cm at a speed of sound of 344 m/s. Furthermore, because low latency digital processing may be a shared feature with active noise cancellation, a digital implementation may offer a sensible trade-off between flexibility and latency. As the desired head-related transfer function may be defined as a finite impulse response (FIR) filter, analog/digital hybrid processing of initial/later FIR taps may be used.

Figure 6:
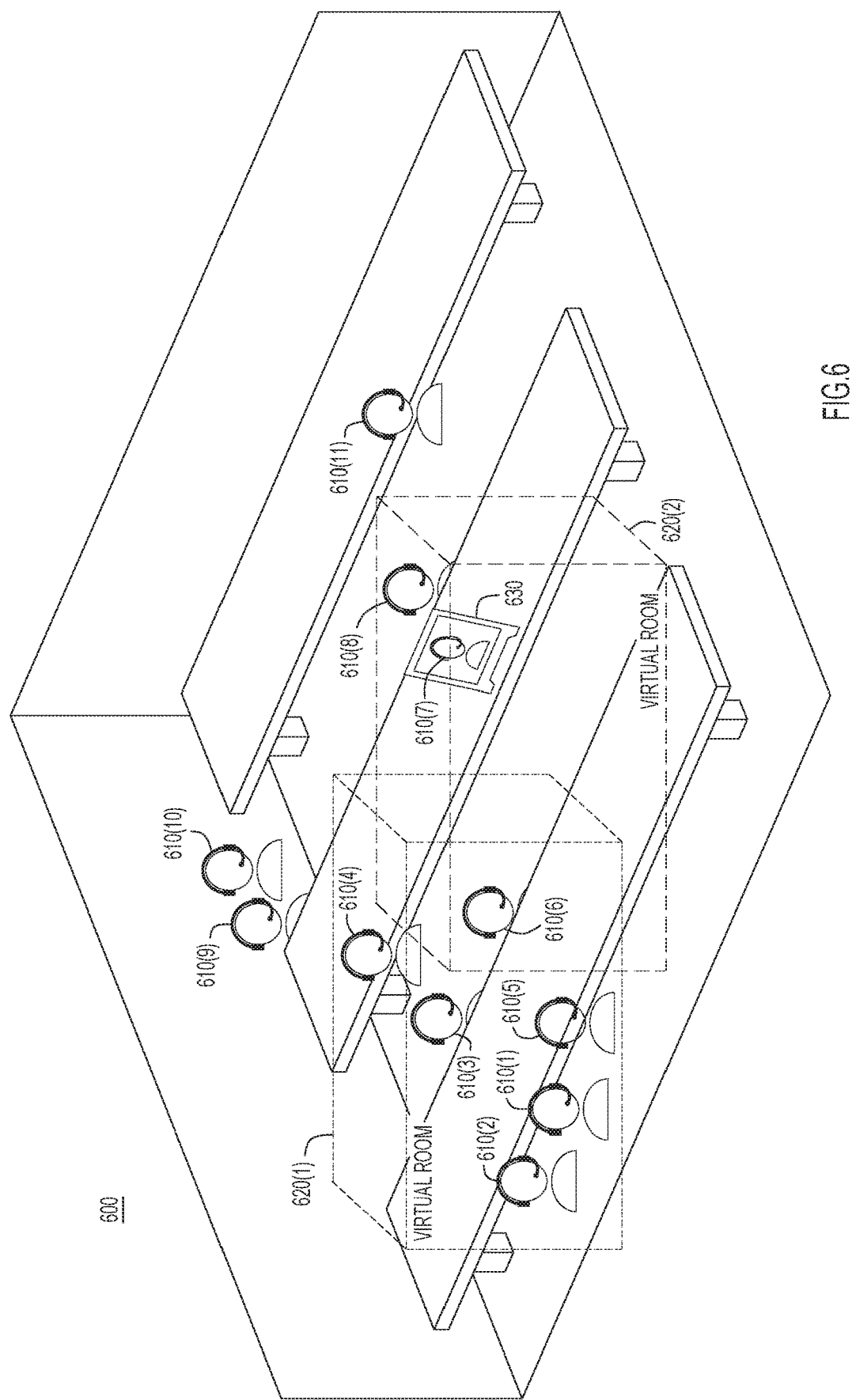
FIG. 6 illustrates a system including a plurality of headsets configured to participate in one or more virtual rooms, according to an example embodiment.

FIG. 6 illustrates an example of a system 600 including a plurality of headsets 610(1)-610(11) configured to participate in one or more virtual rooms. Headsets 610(1)-610(11) may include ad-hoc communication logic 155. As shown, headsets 610(1)-610(11) are worn by respective users who are physically or virtually located in an open office environment. In this example, virtual room 620(1) hosts headsets 610(1)-610(5), which are configured to communicate with each other. Virtual room 620(2) hosts headsets 610(7) and 610(8), which are configured to communicate with each other. Headset 610(7) is worn by a user who is calling in remotely and is displayed on video conference endpoint 630.

Virtual room 620(1) may host a first virtual meeting and virtual room 620(2) may host a second virtual meeting. Headsets 610(1)-610(5) and headsets 610(7) and 610(8) are prohibited from communicating with each other because headsets 610(1)-610(5) are hosted by virtual room 620(1) and headsets 610(7) and 610(8) are hosted by virtual room 620(2).

The user of headset 610(6) may wish to partake in both virtual meetings. As such, the user may cause headset 610(6) to join virtual room 620(1) and virtual room 620(2). Headset 610(6) may permit communication with headsets 610(1)-610(5) and headsets 610(7) and 610(8). For example, headset 610(6) may manually or automatically switch audio feeds (receiving and/or transmitting) between the two meetings. Alternatively, headset 610(6) may transmit/receive audio feeds to/from headsets 610(1)-610(5) and headsets 610(7) and 610(8) simultaneously. Thus, using physical position and visual cues as reference, a set of realistic acoustic spaces allows undisturbed spoken communication in simultaneous but independent groups. An attractive property of system 600 is that the user of headset 610(6) may be more tightly integrated into the second virtual meeting. By sharing one virtual audio scene with those physically present, the user experience of user of headset 610(6) may be improved to comparable levels of those physically present.

Figure 7C:
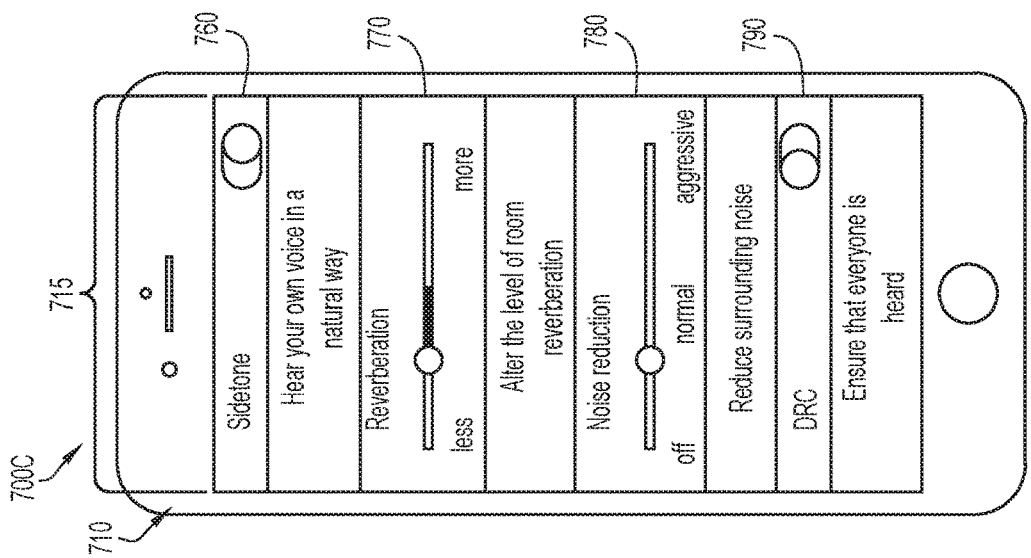
FIGS. 7A-7C illustrate respective windows of a user interface configured to enable a headset to participate in ad-hoc communication, according to an example embodiment.
Figure 7B:
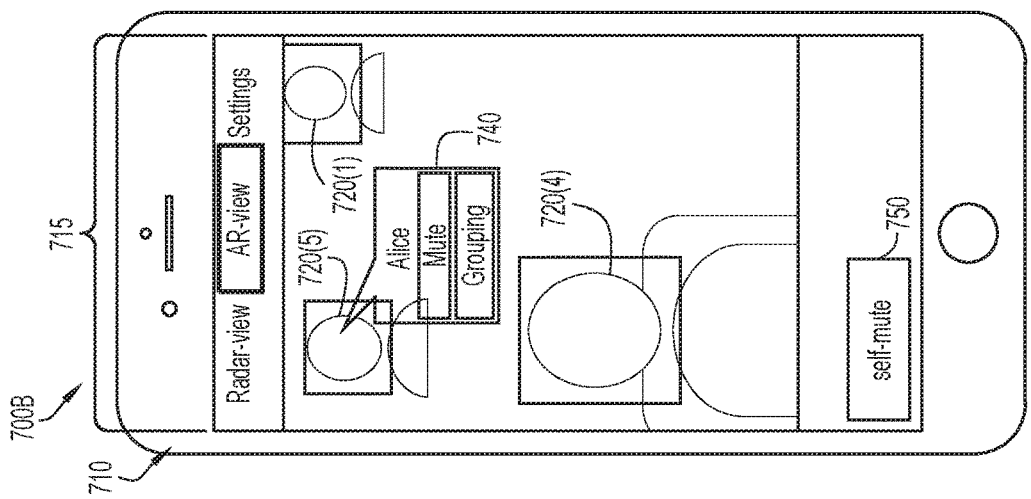
Figure 7A:
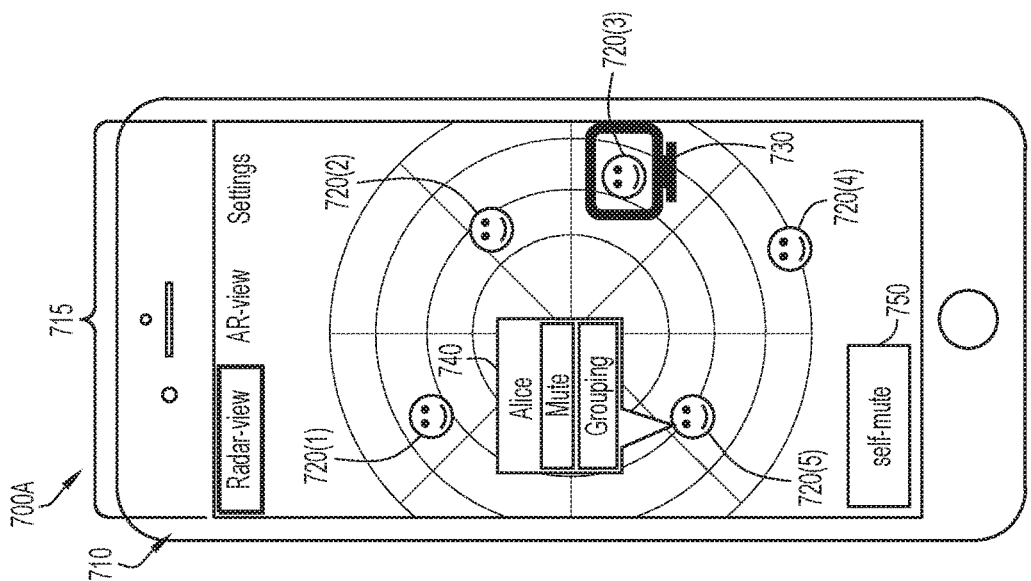

FIGS. 7A-7C illustrate respective user interface screens 700A-700C of an example user interface configured to enable a headset to participate in ad-hoc communication. The user interface screens 700A-700C are displayed on smartphone 710 via a software application, but in other examples may be displayed on a video endpoint. The user interface may be in direct wired or wireless communication with the headset. Briefly, user interface screen 700A shows a radar view of an open office space, user interface screen 700B shows an augmented reality view of the open office space, and user interface screen 700C provides user-adjustable settings. The user interface screens 700A-700C include options 715 for the user to toggle between the radar view, augmented reality view, and settings. Screens 700A and 700B may allow a user to establish and/or terminate an ad-hoc communication session.

With reference to FIG. 7A, user interface screen 700A is a radar view of an open office space which includes five users 720(1)-720(5) wearing headsets. User 720(3) is physically remote from the open office space but is displayed on a video conferencing endpoint in the open office space, as indicated by monitor icon 730. As shown, a menu 740 corresponding to user 720(5) is displayed. The menu may be displayed automatically or in response to a user selection of user 720(5). Menu 740 includes an indication of the name of user 720(5) ("Alice"), an option to mute user 720(5) such that the user does not receive any audio from user 720(5) ("Mute"), and an option to view the group (e.g., virtual meeting) to which user 720(5) belongs ("Grouping"). There is also a self-mute option 750 which, when selected, prevents user audio from being transmitted to users 720(1)-720(5). In this example, the user of the user interface is not displayed in the radar view with users 720(1)-720(5), but in other examples the user may be displayed. The user may select one or more of users 720(1)-720(5) via the user interface to establish an ad-hoc communication session.

Turning to FIG. 7B, user interface screen 700B is an augmented reality view of the open office space. Here, the user is pointing a camera of smartphone 710 toward a portion of the open office environment. The camera captures users 720(1), 720(4), and 720(5), and displays them on the display of smartphone 710. Users 720(2) and 720(3) may be out of range of the camera. Smartphone 710 further augments the display of users 720(1), 720(4), and 720(5) with menu 740, for example. User interface screen 700B also includes self-mute option 750.

FIG. 7C illustrates user interface screen 700C, which displays various settings adjustable by the user. The settings include sidetone setting 760, reverberation setting 770, noise reduction setting 780, and Dynamic Range Compression (DRC) setting 790. Sidetone setting 760 allows the user to toggle the voice of the user output from the headset speakers. Reverberation setting 770 allows the user to modify the level of reverberation present in the audio output. Noise reduction setting 780 allows the user to vary the noise reduction by the headset. DRC setting 790 allows the user to turn on or off DRC for the user(s) involved in the ad-hoc communication.

Figure 8:
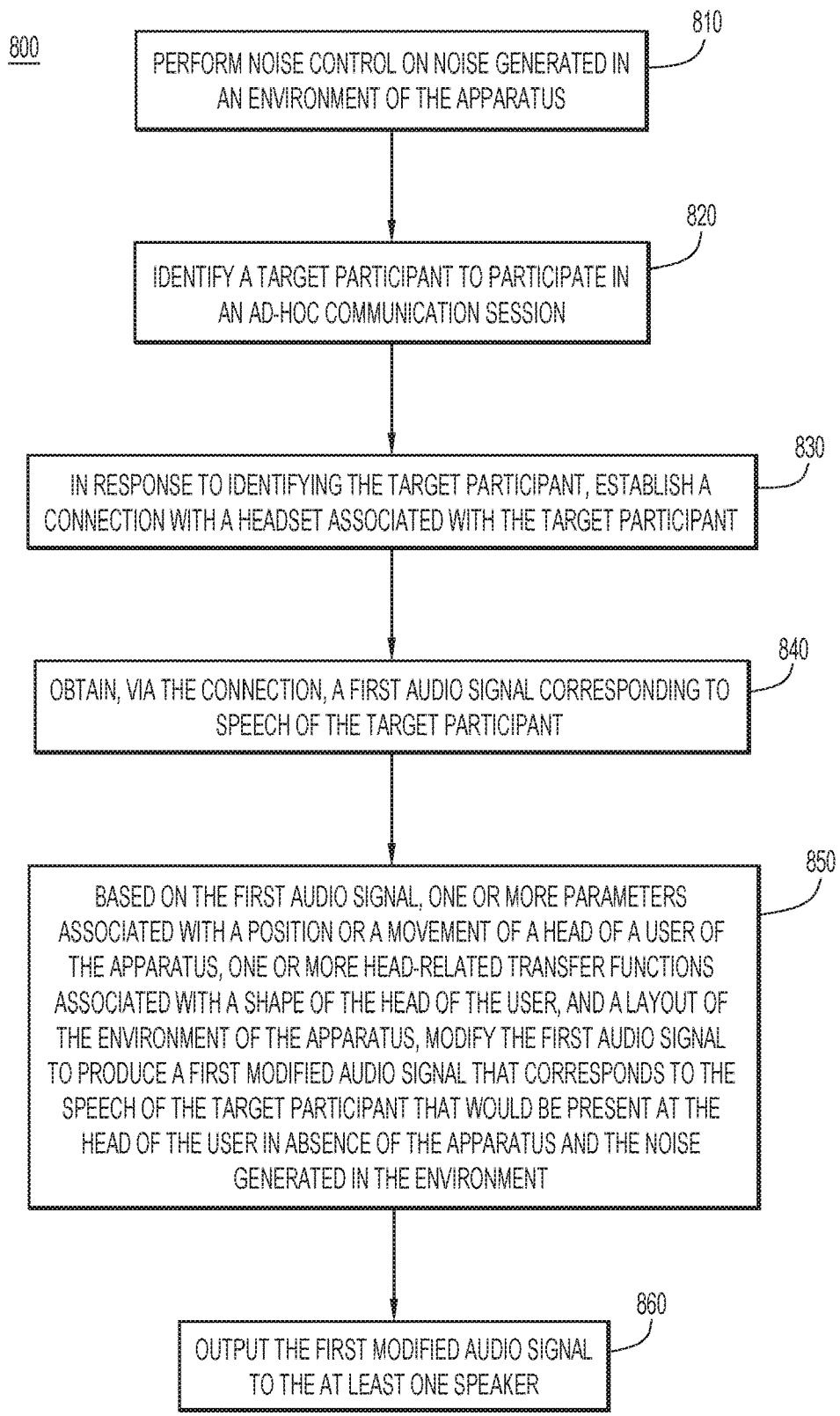
FIG. 8 illustrates a flowchart of a method for headset-enabled ad-hoc communication, according to an example embodiment.

FIG. 8 is a flowchart of an example method 800 for headset-enabled ad-hoc communication. Method 800 may be performed by an apparatus such as a headset. At 810, the apparatus performs noise control on noise generated in an environment of the apparatus. At 820, the apparatus identifies a target participant to participate in an ad-hoc communication session. At 830, in response to identifying the target participant, the apparatus establishes a connection with a headset associated with the target participant. At 840, the apparatus obtains, via the connection, a first audio signal corresponding to speech of the target participant. At 850, based on the first audio signal, one or more parameters associated with a position or a movement of a head of a user of the apparatus, one or more head-related transfer functions associated with a shape of the head of the user, and a layout of the environment of the apparatus, the apparatus modifies the first audio signal to produce a first modified audio signal that corresponds to the speech of the target participant that would be present at the head of the user in absence of the apparatus and the noise generated in the environment. At 860, the apparatus outputs the first modified audio signal to at least one speaker.

Although examples provided herein focus on open floor plan offices, office workers, and video/audio conferencing, it will be appreciated that the techniques described herein may be adapted to a wide range of use cases. One such use case involves motorcyclists who want to communicate with each other while driving. Due to the physical background noise (e.g., wind, engine noise, etc.), as well as the presence of helmets that can limit access to/from ears and mouth, direct communication may not be possible while the motorcyclists are operating their motorcycles. Using the technology described herein, a helmet (headset) may actively suppress the background noise while rendering communication as if the other motorcyclist(s) were talking without the helmets, wind, and engine noise. For example, audio from a first motorcyclist driving behind a second motorcyclist at thirty-five degrees may be rendered by the helmet as if the first motorcyclist was thirty-five degrees behind the second motorcyclist. Thus, the second motorcyclist may determine where the first motorcyclist is without removing his or her gaze from traffic.

A second use case involves operators of noisy and potentially physically dangerous machines, such as chainsaws. Those operators may need to use noise protection to prevent hearing damage from the noise produced by the machines. Traditionally, there has been no practical way to use noise protection that both renders desired sound (e.g., speech from colleagues) and attenuates harmful sounds (e.g., a chainsaw motor) when both the desired and harmful sounds are present simultaneously. In some cases, the desired sound may be critical for safety (e.g., a warning that a tree is falling). Techniques describe herein enable a headset to render the speech of every colleague while simultaneously suppressing harmful noise to a high degree (e.g. 30-40 dB, and possibly more using specialized passive protection). The true directional information that is inherent to natural speech communication may also be rendered accurately. Instant and subconscious awareness that a colleague is shouting a warning about a falling tree, as well as the location and orientation of the colleague, may be critical for user safety.

In a third use case, a group of soldiers may be present in an environment that usually features low noise and therefore supports direct physical speech communication. However, loud talking may not be permissible due to concerns of enemy detection. Further, hearing protection may be required for the short bursts of loud noise that are inherent to warfare on the ground. With the technology described herein, the soldiers may whisper/talk quietly so as to avoid detection by the enemy while wearing noise protection. Headsets worn by each soldier may render speech at the ears of the soldiers as if the speech had traveled by air. Automatic gain control may also boost rendered levels to levels that are higher than physically accurate, thus enhancing or augmenting the realistic experience to a plausible but functionally relevant mode of operation.

The programs described herein are identified based upon the application for which they are implemented in a specific embodiment. However, it should be appreciated that any particular program nomenclature herein is used merely for convenience, and thus the embodiments should not be limited to use solely in any specific application identified and/or implied by such nomenclature.

Data relating to operations described herein may be stored within any conventional or other data structures (e.g., files, arrays, lists, stacks, queues, records, etc.) and may be stored in any desired storage unit (e.g., database, data or other repositories, queue, etc.). The data transmitted between entities may include any desired format and arrangement, and may include any quantity of any types of fields of any size to store the data. The definition and data model for any datasets may indicate the overall structure in any desired fashion (e.g., computer-related languages, graphical representation, listing, etc.).

The present embodiments may employ any number of any type of user interface (e.g., Graphical User Interface (GUI), command-line, prompt, etc.) for obtaining or providing information, where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The environment of the present embodiments may include any number of computer or other processing systems (e.g., client or end-user systems, server systems, etc.) and databases or other repositories arranged in any desired fashion, where the present embodiments may be applied to any desired type of computing environment (e.g., cloud computing, client-server, network computing, mainframe, stand-alone systems, etc.). The computer or other processing systems employed by the present embodiments may be implemented by any number of any personal or other type of computer or processing system (e.g., desktop, laptop, Personal Digital Assistant (PDA), mobile devices, etc.), and may include any commercially available operating system and any combination of commercially available and custom software (e.g., machine learning software, etc.). These systems may include any types of monitors and input devices (e.g., keyboard, mouse, voice recognition, etc.) to enter and/or view information.

It is to be understood that the software of the present embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., Local Area Network (LAN), Wide Area Network (WAN), Intranet, Internet, hardwire, modem connection, wireless, etc.). For example, the functions of the present embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present embodiments may be available on a non-transitory computer useable medium (e.g., magnetic or optical mediums, magneto-optic mediums, floppy diskettes, Compact Disc ROM (CD-ROM), Digital Versatile Disk (DVD), memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, Virtual Private Network (VPN), etc.). The computer or other processing systems of the present embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information. The database system may be implemented by any number of any conventional or other databases, data stores or storage structures (e.g., files, databases, data structures, data or other repositories, etc.) to store information. The database system may be included within or coupled to the server and/or client systems. The database systems and/or storage structures may be remote from or local to the computer or other processing systems, and may store any desired data.

The embodiments presented may be in various forms, such as a system, a method, and/or a computer program product at any possible technical detail level of integration. The computer program product may include a computer readable storage medium (or media) having computer readable program instructions thereon for causing a processor to carry out aspects of presented herein.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a RAM, a ROM, Erasable Programmable ROM (EPROM), Flash memory, a Static RAM (SRAM), a portable CD-ROM, a DVD, a memory stick, a floppy disk, a mechanically encoded device, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, Instruction-Set-Architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some embodiments, electronic circuitry including, for example, programmable logic circuitry, Field-Programmable Gate Arrays (FPGA), or Programmable Logic Arrays (PLA) may execute the computer readable program instructions by utilizing state information of the computer readable program instructions to personalize the electronic circuitry, in order to perform aspects presented herein.

Aspects of the present embodiments are described herein with reference to flowchart illustrations and/or block diagrams of methods, apparatus (systems), and computer program products according to the embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In one form, an apparatus is provided. The apparatus comprises: at least one speaker; and one or more processors communicable with the at least one speaker, wherein the one or more processors are configured to: perform noise control on noise generated in an environment of the apparatus; identify a target participant to participate in an ad-hoc communication session; in response to identifying the target participant, establish a connection with a headset associated with the target participant; obtain, via the connection, a first audio signal corresponding to speech of the target participant; based on the first audio signal, one or more parameters associated with a position or a movement of a head of a user of the apparatus, one or more head-related transfer functions associated with a shape of the head of the user, and a layout of the environment of the apparatus, modify the first audio signal to produce a first modified audio signal that corresponds to the speech of the target participant that would be present at the head of the user in absence of the apparatus and the noise generated in the environment; and output the first modified audio signal to the at least one speaker.

In one example, the one or more processors are further configured to: obtain a second audio signal corresponding to speech of the user; based on the second audio signal, the one or more parameters, the one or more head-related transfer functions, and the layout of the environment of the apparatus, modify the second audio signal to produce a second modified audio signal that corresponds to the speech of the user that would be present at the head of the user in absence of the apparatus and the noise generated in the environment; and output the second modified audio signal to the at least one speaker.

In one example, the connection is a peer-to-peer connection.

In one example, the one or more processors are configured to identify the target participant in response to obtaining a user selection of the target participant.

In one example, the one or more processors are configured to identify the target participant in response to determining that the target participant is positioned in a given physical location relative to the head of the user.

In one example, the target participant is a remote video conference target participant presented on a display to the user of the apparatus.

In one example, the one or more processors are further configured to: join a first virtual room hosting a first group of headsets, wherein the first group of headsets are configured to communicate with each other; join a second virtual room hosting a second group of headsets, wherein the second group of headsets are configured to communicate with each other, and wherein the first group of headsets and the second group of headsets are prohibited from communicating with each other; and permit communication with the first group of headsets and with the second group of headsets.

In one example, the apparatus further comprises a first microphone and a second microphone, and wherein the at least one speaker includes a first speaker and a second speaker, the apparatus further comprising: a first earpiece configured to house the first speaker and the first microphone; a second earpiece configured to house the second speaker and the second microphone; and a boom configured to house a third microphone.

In another form, a method is provided. The method comprises: performing noise control on noise generated in an environment of a first headset; identifying a target participant to participate in an ad-hoc communication session; in response to identifying the target participant, establishing a connection with a second headset, wherein the second headset is associated with the target participant; obtaining, via the connection, a first audio signal corresponding to speech of the target participant; based on the first audio signal, one or more parameters associated with a position or a movement of a head of a user of the first headset, one or more head-related transfer functions associated with a shape of the head of the user, and a layout of the environment of the first headset, modifying the first audio signal to produce a first modified audio signal that corresponds to the speech of the target participant that would be present at the head of the user in absence of the first headset and the noise generated in the environment; and outputting the first modified audio signal to at least one speaker of the first headset.

In another form, one or more non-transitory computer readable storage media are provided. The non-transitory computer readable storage media are encoded with instructions that, when executed by a processor, cause the processor to: perform noise control on noise generated in an environment of a first headset; identify a target participant to participate in an ad-hoc communication session; in response to identifying the target participant, establish a connection with a second headset, wherein the second headset is associated with the target participant; obtain, via the connection, a first audio signal corresponding to speech of the target participant; based on the first audio signal, one or more parameters associated with a position or a movement of a head of a user of the first headset, one or more head-related transfer functions associated with a shape of the head of the user, and a layout of the environment of the first headset, modify the first audio signal to produce a first modified audio signal that corresponds to the speech of the target participant that would be present at the head of the user in absence of the first headset and the noise generated in the environment; and output the first modified audio signal to at least one speaker of the first headset.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. An apparatus comprising:
at least one speaker; and
one or more processors communicable with the at least one speaker, wherein the one or more processors are configured to:
perform noise control on noise generated in an environment of the apparatus;
identify a target participant to participate in an ad-hoc communication session;
in response to identifying the target participant, establish a connection with a headset associated with the target participant;
obtain, via the connection, a first audio signal corresponding to speech of the target participant;
based on the first audio signal, one or more parameters associated with a position or a movement of a head of a user of the apparatus, wherein the user is a participant in the ad-hoc communication session, one or more head-related transfer functions associated with a shape of the head of the user, and a layout of the environment of the apparatus, modify the first audio signal to produce a first modified audio signal that corresponds to the speech of the target participant that would be present at the head of the user in absence of the apparatus and the noise generated in the environment; and output the first modified audio signal to the at least one speaker as a part of the ad-hoc communication session.

2. The apparatus of claim 1, wherein the one or more processors are further configured to:

obtain a second audio signal corresponding to speech of the user;

based on the second audio signal, the one or more parameters, the one or more head-related transfer functions, and the layout of the environment of the apparatus, modify the second audio signal to produce a second modified audio signal that corresponds to the speech of the user that would be present at the head of the user in absence of the apparatus and the noise generated in the environment; and output the second modified audio signal to the at least one speaker.

3. The apparatus of claim 1, wherein the connection is a peer-to-peer connection.

4. The apparatus of claim 1, wherein the one or more processors are configured to identify the target participant in response to obtaining a selection by the user of the target participant.

5. The apparatus of claim 1, wherein the one or more processors are configured to identify the target participant in response to determining that the target participant is positioned in a given physical location relative to the head of the user.

6. The apparatus of claim 1, wherein the target participant is a remote video conference target participant presented on a display to the user.

7. The apparatus of claim 1, wherein the one or more processors are further configured to:

join a first virtual room hosting a first group of headsets, wherein the first group of headsets are configured to communicate with each other;

join a second virtual room hosting a second group of headsets, wherein the second group of headsets are configured to communicate with each other, and wherein the first group of headsets and the second group of headsets are prohibited from communicating with each other; and permit communication with the first group of headsets and with the second group of headsets.

8. The apparatus of claim 1, further comprising a first microphone and a second microphone, and wherein the at least one speaker includes a first speaker and a second speaker, the apparatus further comprising:

a first earpiece configured to house the first speaker and the first microphone;

a second earpiece configured to house the second speaker and the second microphone; and a boom configured to house a third microphone.

9. A method comprising:

performing noise control on noise generated in an environment of a first headset;

identifying a target participant to participate in an ad-hoc communication session;

in response to identifying the target participant, establishing a connection with a second headset, wherein the second headset is associated with the target participant;

obtaining, via the connection, a first audio signal corresponding to speech of the target participant;

based on the first audio signal, one or more parameters associated with a position or a movement of a head of a user of the first headset, wherein the user is a participant in the ad-hoc communication session, one or more head-related transfer functions associated with a shape of the head of the user, and a layout of the environment of the first headset, modifying the first audio signal to produce a first modified audio signal that corresponds to the speech of the target participant that would be present at the head of the user in absence of the first headset and the noise generated in the environment; and outputting the first modified audio signal to at least one speaker of the first headset as a part of the ad-hoc communication session.

10. The method of claim 9, further comprising:

obtaining a second audio signal corresponding to speech of the user;

based on the second audio signal, the one or more parameters, the one or more head-related transfer functions, and the layout of the environment of the first headset, modifying the second audio signal to produce a second modified audio signal that corresponds to the speech of the user that would be present at the head of the user in absence of the first headset and the noise generated in the environment; and outputting the second modified audio signal to the at least one speaker.

11. The method of claim 9, wherein the connection is a peer-to-peer connection.

12. The method of claim 9, wherein identifying the target participant includes identifying the target participant in response to obtaining a selection by the user of the target participant.

13. The method of claim 9, wherein identifying the target participant includes identifying the target participant in response to determining that the target participant is positioned in a given physical location relative to the head of the user.

14. The method of claim 9, wherein the target participant is a remote video conference target participant presented on a display to the user.

15. The method of claim 9, further comprising:

joining a first virtual room hosting a first group of headsets, wherein the first group of headsets are configured to communicate with each other;

joining a second virtual room hosting a second group of headsets, wherein the second group of headsets are configured to communicate with each other, and wherein the first group of headsets and the second group of headsets are prohibited from communicating with each other; and permitting communication with the first group of headsets and with the second group of headsets.

16. One or more non-transitory computer readable storage media encoded with instructions that, when executed by a processor, cause the processor to:

perform noise control on noise generated in an environment of a first headset;

identify a target participant to participate in an ad-hoc communication session;

in response to identifying the target participant, establish a connection with a second headset, wherein the second headset is associated with the target participant;

obtain, via the connection, a first audio signal corresponding to speech of the target participant;

based on the first audio signal, one or more parameters associated with a position or a movement of a head of a user of the first headset, wherein the user is a participant in the ad-hoc communication session, one or more head-related transfer functions associated with a shape of the head of the user, and a layout of the environment of the first headset, modify the first audio signal to produce a first modified audio signal that corresponds to the speech of the target participant that would be present at the head of the user in absence of the first headset and the noise generated in the environment; and output the first modified audio signal to at least one speaker of the first headset as a part of the ad-hoc communication session.

17. The one or more non-transitory computer readable storage media of claim 16, wherein the instructions further cause the processor to:

obtain a second audio signal corresponding to speech of the user;

based on the second audio signal, the one or more parameters, the one or more head-related transfer functions, and the layout of the environment of the first headset, modify the second audio signal to produce a second modified audio signal that corresponds to the speech of the user that would be present at the head of the user in absence of the first headset and the noise generated in the environment; and output the second modified audio signal to the at least one speaker.

18. The one or more non-transitory computer readable storage media of claim 16, wherein the connection is a peer-to-peer connection.

19. The one or more non-transitory computer readable storage media of claim 16, wherein the instructions cause the processor to identify the target participant in response to obtaining a selection by the user of the target participant.

20. The one or more non-transitory computer readable storage media of claim 16, wherein the instructions cause the processor to identify the target participant in response to determining that the target participant is positioned in a given physical location relative to the head of the user.

* * * * *